(12) United States Patent
Jaradi et al.

(10) Patent No.: US 10,906,504 B2
(45) Date of Patent: Feb. 2, 2021

(54) SEATBELT RETRACTOR ASSEMBLY

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 234 days.

(21) Appl. No.: 15/871,373

(22) Filed: Jan. 15, 2018

(65) Prior Publication Data

US 2019/0217814 A1    Jul. 18, 2019

(51) Int. Cl.
| | | |
|---|---|---|
| *B60R 22/41* | (2006.01) | |
| *B60R 22/40* | (2006.01) | |
| *B60R 22/343* | (2006.01) | |
| *B60R 21/01* | (2006.01) | |
| *B60R 22/46* | (2006.01) | |

(52) U.S. Cl.
CPC ............ *B60R 22/41* (2013.01); *B60R 22/343* (2013.01); *B60R 22/40* (2013.01); *B60R 2021/01013* (2013.01); *B60R 2022/4666* (2013.01)

(58) Field of Classification Search
CPC ....... B60R 22/40; B60R 22/41; B60R 22/343; B60R 2022/4666; B60R 2021/01013
See application file for complete search history.

(56) References Cited

U.S. PATENT DOCUMENTS

| | | | |
|---|---|---|---|
| 4,198,011 A | 4/1980 | Kamijo et al. | |
| 4,209,186 A | 6/1980 | Close | |
| 4,757,954 A | 7/1988 | Doty | |
| 4,817,754 A * | 4/1989 | Muramoto | ............ B60R 22/023 |
| | | | 180/268 |
| 6,386,472 B1 | 5/2002 | Rogers, Jr. | |
| 6,959,947 B2 * | 11/2005 | Sakakida | ................ B60R 22/24 |
| | | | 180/268 |
| 7,770,929 B2 | 8/2010 | Ehlers | |
| 2016/0375857 A1 | 12/2016 | Jaradi et al. | |

* cited by examiner

*Primary Examiner* — Sang K Kim
(74) *Attorney, Agent, or Firm* — Frank A. MacKenzie; Bejin Bieneman PLC

(57) ABSTRACT

A system includes a seatbelt retractor having a spool and a braking claw selectively engageable with the spool. The system includes an actuator designed to inhibit engagement of the braking claw with the spool. The system includes a processor and a memory storing program instructions executable by the processor to actuate the actuator to inhibit engagement of the braking claw with the spool for a threshold amount of time after detecting an impact of a vehicle.

7 Claims, 5 Drawing Sheets

SEATBELT RETRACTOR ASSEMBLY

BACKGROUND

A vehicle restraint system may include a seatbelt assembly that secures the occupant of a vehicle against harmful movement that may result from a vehicle collision. The seatbelt assembly functions to reduce the likelihood of injury by reducing the force of occupant impacts with vehicle interior structures. In this role, the seatbelt assembly applies loads across the chest or lap of the occupant.

DETAILED DESCRIPTION

Figure 1:
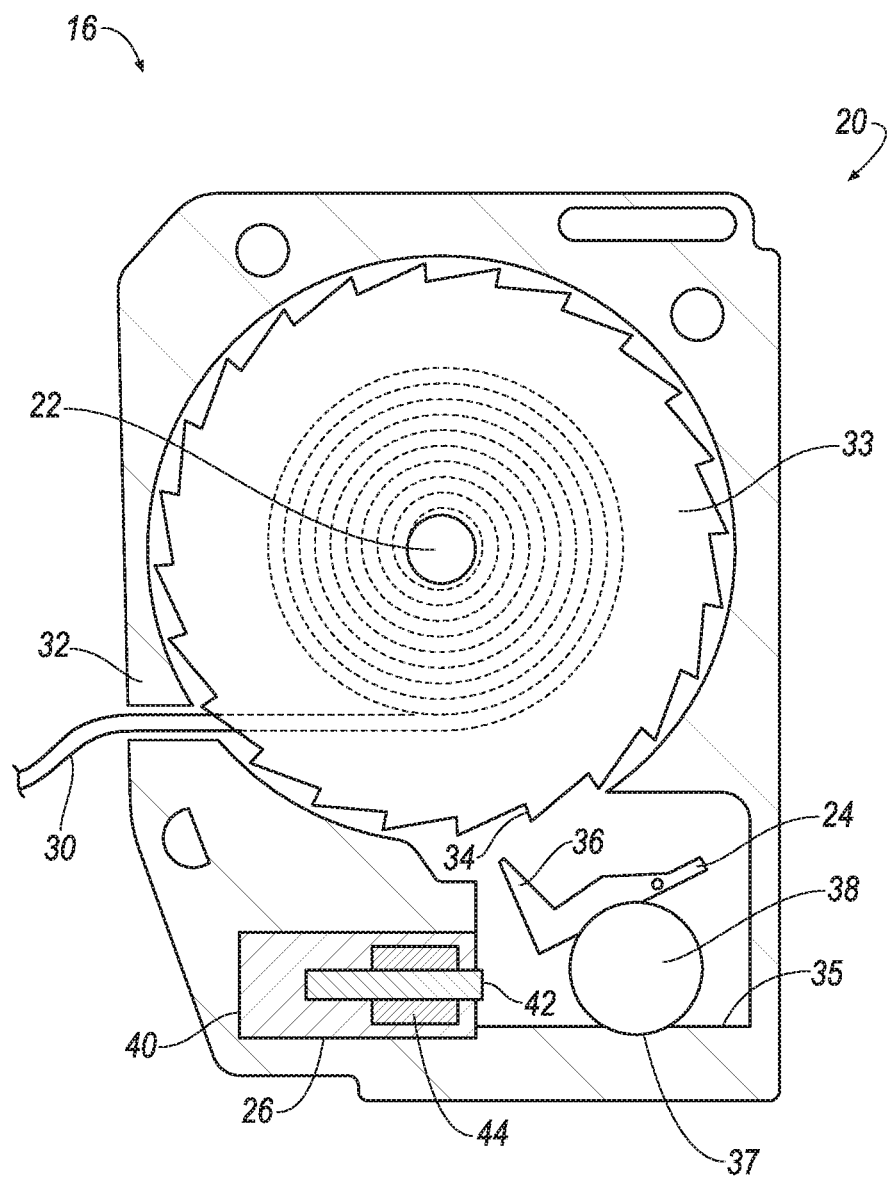
FIG. 1 is a cross section of an example seatbelt retractor with a ball sensor in a first position and an actuator in a retracted position.

A system includes a seatbelt retractor having a spool and a braking claw selectively engageable with the spool. The system includes an actuator designed to inhibit engagement of the braking claw with the spool. The system includes a processor and a memory storing program instructions executable by the processor to actuate the actuator to inhibit engagement of the braking claw with the spool for a threshold amount of time after detecting an impact of a vehicle.

The actuator may be an electromagnetic linear actuator.

The system may include a ball sensor movable from a first position where the ball sensor does not urge the braking claw into engagement with the spool to a second position where the ball sensor urges the braking claw into engagement with the spool.

The actuator may be designed to inhibit movement of the ball sensor from the first position to the second position.

The actuator may be moveable between a retracted position in which the actuator does not urge the ball sensor to the first position and an extended position in which the actuator urges the ball sensor to the first position.

The memory may further store instructions to actuate the actuator to permit engagement of the braking claw with the spool after the threshold amount of time has lapsed.

A system includes a processor and a memory storing program instructions executable by the processor to actuate an actuator to inhibit restricting rotation of a spool relative to a housing of a seatbelt retractor for a threshold amount of time after detecting an impact of a vehicle, and actuate the actuator to permit restricting rotation of the spool relative to the housing after the threshold amount of time has lapsed.

The threshold amount of time may be based on a detected force of the impact.

The threshold amount of time may be based on a type of the impact.

The type of the impact may be one of a front impact, an oblique impact, and a side impact.

The threshold amount of time may be based on a speed of the vehicle when the impact is detected.

The threshold amount of time may be between 20 and 30 milliseconds.

The memory may further store instructions to actuate a seatbelt pretensioner before inhibiting restricting rotation of the spool relative to the housing.

A method includes inhibiting restricting rotation of a spool relative to a housing of a seatbelt retractor for a threshold amount of time after detecting an impact of a vehicle. The method includes permitting restricting rotation of the spool relative to the housing after the threshold amount of time has lapsed.

The threshold amount of time may be based on a detected force of the impact.

The threshold amount of time may be based on a type of the impact.

The type of the impact may be one of a front impact, an oblique impact, and a side impact.

The threshold amount of time may be based on a speed of the vehicle when the impact is detected.

The threshold amount of time may be between 20 and 30 milliseconds.

The method may include actuating a seatbelt pretensioner before inhibiting restricting rotation of the spool relative to the housing.

A computer may be programmed to perform the method.

A computer readable medium may store program instructions executable by a computer processor to perform the method.

With reference to the Figures, wherein like numerals indicate like parts throughout the several views, a system 16 for restraining an occupant of a vehicle 18 includes a seatbelt retractor 20 having a spool 22 and a braking claw 24 selectively engageable with the spool 22. The system 16 includes an actuator 26 designed to inhibit engagement of the braking claw 24 with the spool 22. The system 16 includes a computer 28 having a processor and a memory. The memory stores program instructions executable by the processor to actuate the actuator 26 to inhibit engagement of the braking claw 24 with the spool 22 for a threshold amount of time after detecting an impact of the vehicle 18.

Inhibiting engagement of the braking claw 24 with the spool 22 for the threshold amount of the time, e.g., 20-30 milliseconds, after detecting the impact of the vehicle 18 permits a certain amount of webbing 30, e.g., 50 millimeters, to pay out from the seatbelt retractor 20 before the webbing 30 restrains the occupant. The webbing 30 payout permits the webbing 30 to be repositioned on the occupant, permits the occupant to by restrained in a different position, e.g., relative to an airbag of the vehicle 18, etc., and may reduce a likelihood of injury of the occupant.

Figure 4:
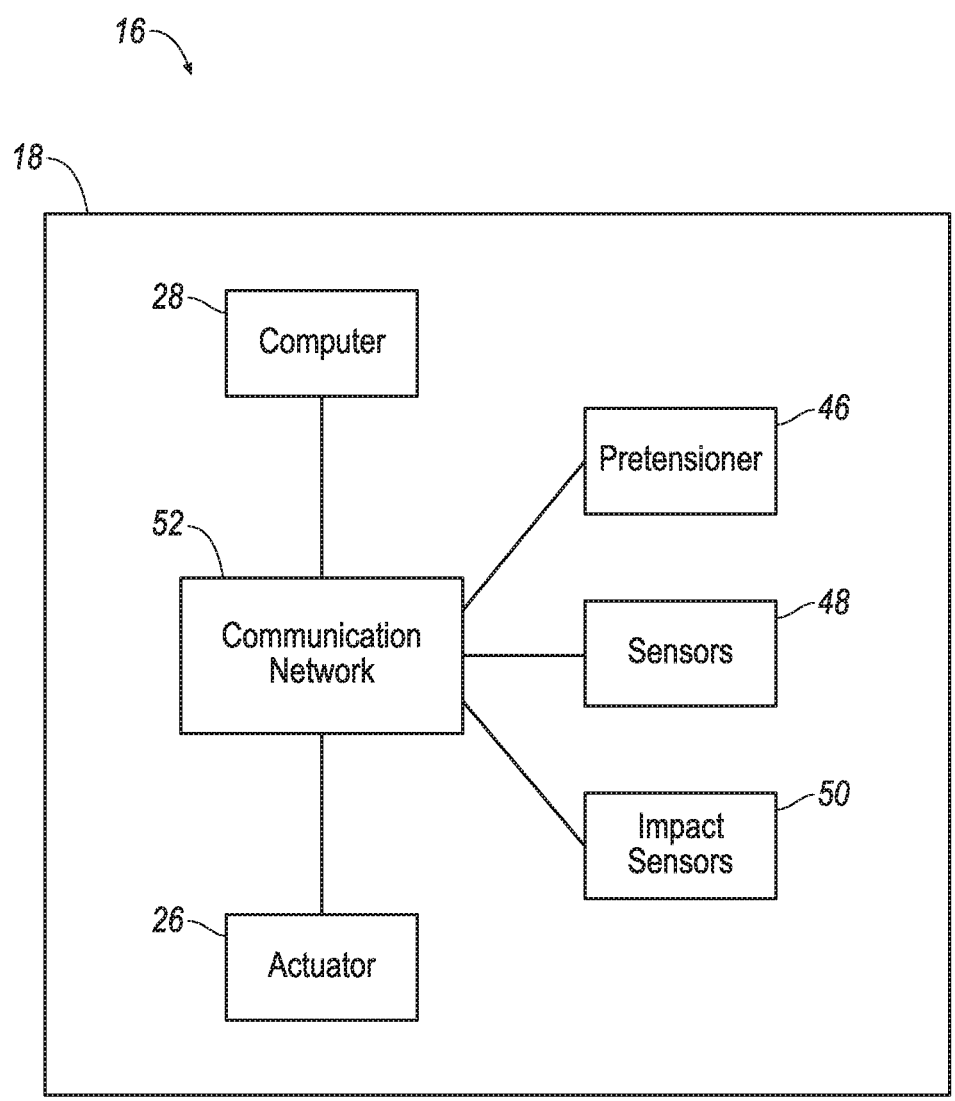
FIG. 4 is as block diagram of components of a vehicle including the example seatbelt retractor.

The vehicle 18, shown in FIG. 4, may be any passenger or commercial automobile such as a car, a truck, a sport utility vehicle, a crossover vehicle, a van, a minivan, a taxi, a bus, etc.

A seatbelt assembly (not numbered) includes the seatbelt retractor 20 and the webbing 30 retractable into and extendable from the seatbelt retractor 20. The seatbelt assembly may include a buckle (not shown), a clip (not shown) slideable along the webbing 30 and releasably engageable with the buckle, a mounting clip (not shown) at the end of the webbing 30, a D-ring slideably engaged with the webbing 30 between the mounting clip and the seatbelt retractor 20, etc.

Figure 2:
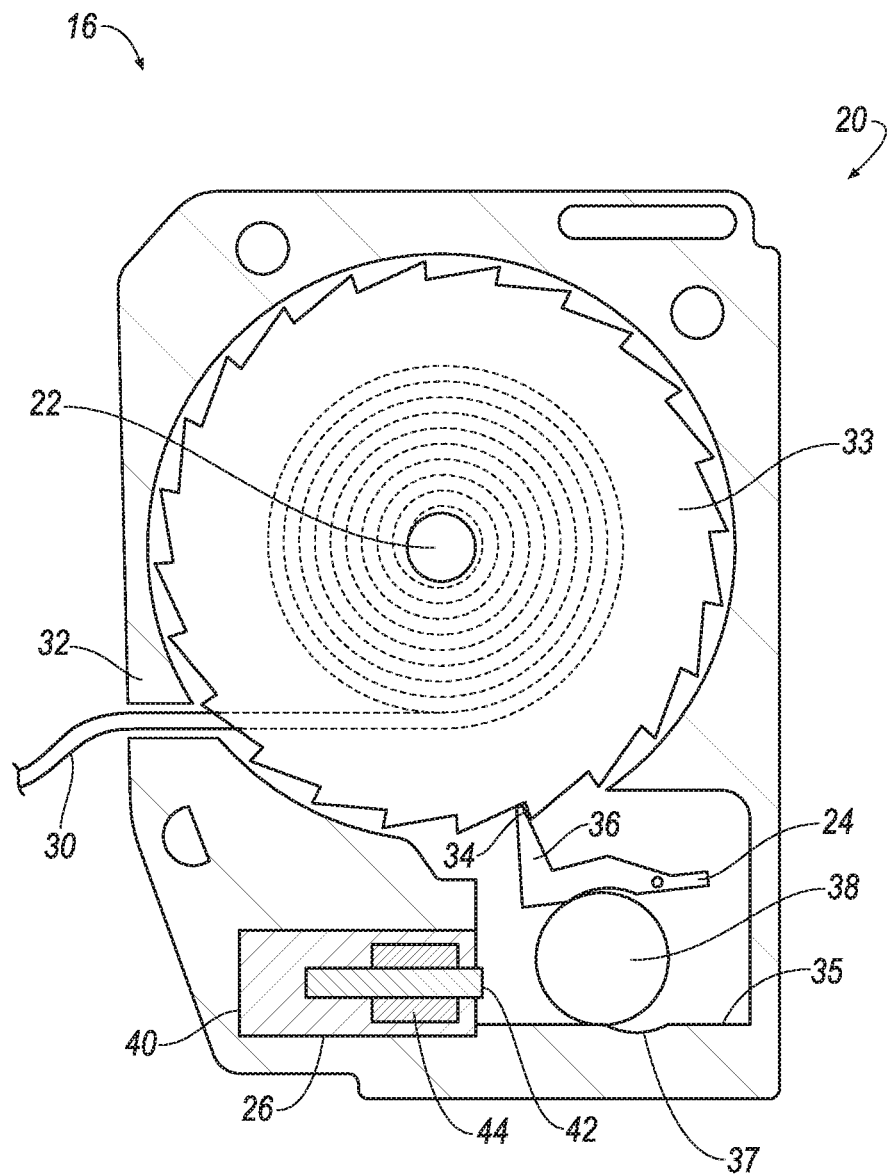
FIG. 2 is a cross section of the example seatbelt retractor of FIG. 1 with the ball sensor in a second position and the actuator in the retracted position.
Figure 3:
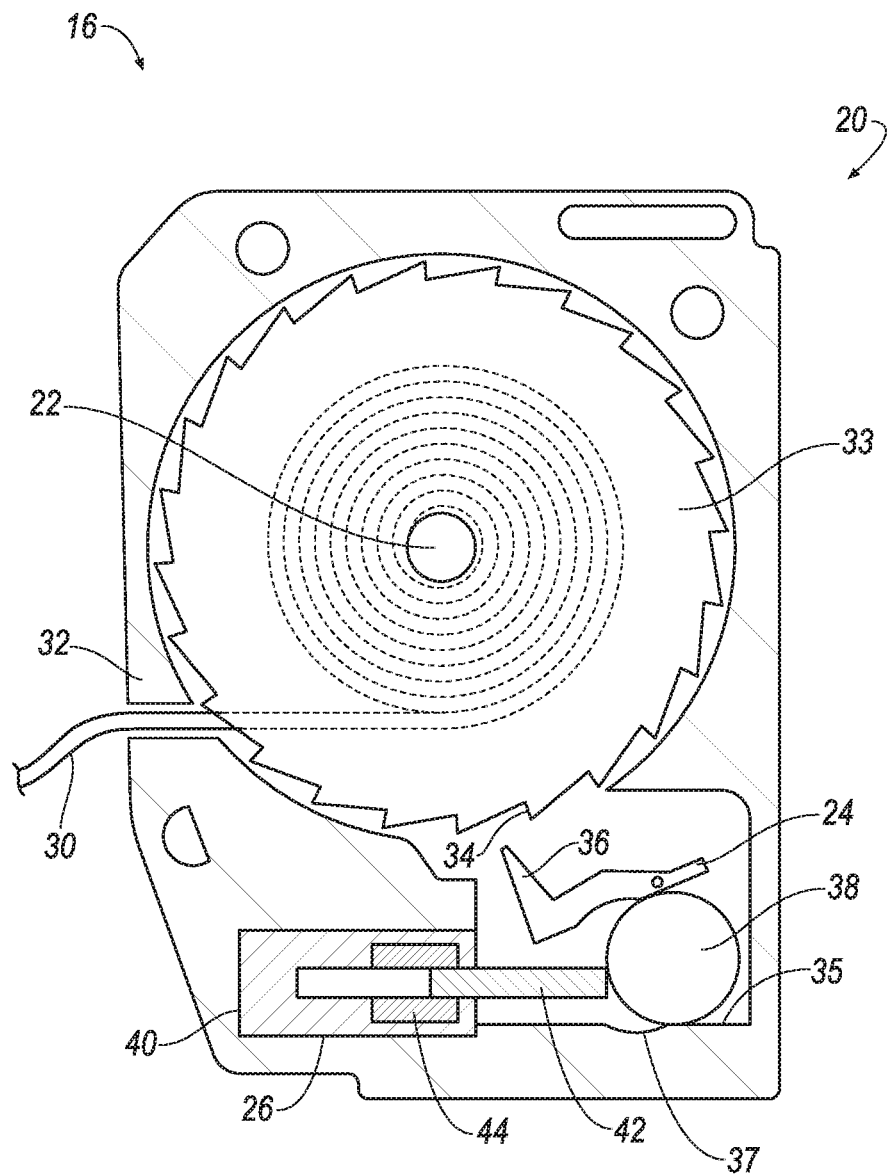
FIG. 3 is a cross section of the example seatbelt retractor of FIG. 1 with the ball sensor in the first position and the actuator in an extended position.

The seatbelt retractor 20, shown in FIGS. 1-3, can be supported by a floor, a roof, a pillar, or any other suitable location of the vehicle 18. The seatbelt retractor 20 includes a housing 32. The spool 22 and the braking claw 24 are within the housing 32.

The spool 22, shown in FIGS. 1-3, may freely rotate within the housing 32. The spool 22 may be adapted to receive the webbing 30, for example, by including a webbing attachment slot and permitting the webbing 30 to wind around the spool 22.

The braking claw 24, shown in FIGS. 1-3, is selectively engageable with the spool 22. When the braking claw 24 is engaged with the spool 22, the braking claw 24 inhibits rotation of the spool 22 relative to the housing 32. For example, an end 36 of the braking claw 24 may engage a tooth 34 of a ratchet gear 33 to inhibit rotation to the ratchet gear 33 relative to the housing 32, as shown in FIG. 2. The ratchet gear 33 may be in mechanical communication with the spool 22 via additional gears, clutches, pawls, pins, plates, etc. (known and therefore not shown) such that restricting rotation of the ratchet gear 33 relative to the housing 32 also restricts rotation of the spool 22 relative to the housing 32. Other structures may be used to engage the braking claw 24 with the spool 22 to inhibit rotation of the spool 22 relative to the housing 32.

When the braking claw 24 is disengaged from the spool 22, the braking claw 24 does not inhibit rotation of the spool 22 relative to the housing 32. For example, the end 36 of the braking claw 24 may be spaced from the ratchet gear 33, as shown in FIGS. 1 and 3.

The braking claw 24 may rotate and/or translate to engage the spool 22. The braking claw 24 may be supported by the housing 32, e.g., with a pin to allow rotation of the braking claw 24 relative to the housing 32, with a track to allow translation of the braking claw 24 relative to the housing 32, etc.

The system 16 may include a ball sensor 38, shown in FIGS. 1-3, for engaging the braking claw 24 with the spool 22. The ball sensor 38 may be a metal ball, or other suitable mass. The ball sensor 38 is movable from a first position, shown in FIGS. 1 and 3, to a second position, shown in FIG. 2, and vice versa. In the first position, the ball sensor 38 does not urge the braking claw 24 into engagement with the spool 22, e.g., with the ratchet gear 33. For example, the ball sensor 38 in the first position may be spaced from the end 36 of the braking claw 24. In the second position, the ball sensor 38 urges the braking claw 24 into engagement with the spool 22, e.g., with the ratchet gear 33. For example, the ball sensor 38 in the second position may press against the braking claw 24, e.g., proximate the end 36.

The ball sensor 38 may move e.g., translate, relative to the housing 32 to when moving between the first position and the second position. For example, momentum of the ball sensor 38 may urge the ball sensor 38 from the first position to the second position, e.g., upon impact or other deceleration of the vehicle 18. In such an example, a cup (not shown) may be pivotally supported by the housing 32 and may support the ball sensor 38, and/or the housing 32 may include a track 35 along which the ball sensor 38 moves between the first position and the second position. As another example, the actuator 26 may urge the ball sensor 38 from the second position to the first position. As yet another example, gravity may urge the ball sensor 38 from the second position to the first position. For example, the track 35 may include a divot 37, and gravity may urge the ball senor 38 into the divot 37. Other structures may be used to urge to ball sensor 38, e.g., springs, magnets, etc. Other structures may be used to selectively engage the braking claw 24 with the spool 22, including various inertial engagement mechanisms.

The actuator 26, shown in FIGS. 1-4, is designed to inhibit engagement of the braking claw 24 with the spool 22, e.g., in response to an instruction from the computer 28. For example, the actuator 26 may be designed to inhibit movement of the ball sensor 38 from the first position to the second position. The actuator 26 may be an electromagnetic linear actuator, e.g., including a housing body 40, a pin 42, and an electromagnetic coil 44. In other words, the actuator 26 may be a solenoid. The actuator 26 may be in the housing 32 of the seatbelt retractor 20.

The actuator 26 may be moveable between a retracted position, shown in FIGS. 1 and 2, and an extended position, shown in FIG. 3, e.g., in response to an instruction from the computer 28. In the extended position, the pin 42 may extend from the housing body 40 further than in the retracted position. Application of a voltage to the electromagnetic coil 44 may urge the pin 42 to the extended position. Reversing a polarity of such voltage may urge the pin 42 to the retracted position. Other structures may be used to urge the pin 42 to the retracted position, e.g., a spring, etc. In the retracted position, the actuator 26 does not urge the ball sensor 38 to the first position. In the extended position, the actuator 26 urges the ball sensor 38 to the first position. For example, the pin 42 in the extended position may occupy where the sensor ball would be in the second position, e.g., to push the ball sensor 38 from the second position to the first position.

Although shown as the linear actuator that pushes the ball sensor 38, the actuator 26 may be of another type and/or design. For example, the actuator 26 may be an electromagnet that generates a magnetic field to inhibit engagement of the braking claw 24 with the spool 22, the actuator 26 may be designed to push and/or pull the braking claw 24, etc.

The webbing 30, shown in FIGS. 1-3, may be formed of fabric, e.g., woven nylon, in the shape of a strap. The webbing 30 may be attached to the spool 22, with the webbing 30 wound around the spool 22. The webbing 30 may be payable from the seatbelt retractor 20, e.g., when the spool 22 is not prevented from rotating by the braking claw 24.

The vehicle 18 may include a pretensioner 46, shown in FIG. 4. The pretensioner 46 may be of any suitable type, such as a ball-in-tube pretensioner, in which an explosive charge propels a ball or balls over a cogwheel; a piston pretensioner, in which an explosive charge drives a piston; a mechanical pretensioner, in which a compressed spring attached is released; or any other suitable type.

The vehicle 18 may include sensors 48, shown in FIG. 4. The sensors 48 may detect internal states of the vehicle 18, for example, wheel speed, wheel orientation, and engine and transmission variables. The sensors 48 may detect the position or orientation of the vehicle 18, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 48 may detect the external world, for example, radar sensors, scanning laser range finders, light detection and ranging (LIDAR) devices, and image processing sensors such as cameras. The sensors 48 may include communications devices, for example, vehicle-to-infrastructure (V2I) or vehicle-to-vehicle (V2V) devices.

The vehicle 18 may include one or more impact sensors 50, shown in FIG. 4. The impact sensors 50 are designed to detect an impact to the vehicle 18. The impact sensors 50 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensors 50 may be located at numerous points in or on the vehicle 18. The impact sensors 50 may be in communication with the computer 28.

The vehicle 18 may include a communication network 52, shown in FIG. 4. The communication network 52 includes hardware, such as a communication bus, for facilitating communication among components, e.g., the actuator 26, the pretensioner 46, the sensors 48, the impact sensors 50, the computer 28, etc. The communication network 52 may facilitate wired or wireless communication among the components in accordance with a number of communication protocols such as computer area network (CAN), Ethernet, WiFi, Local Interconnect Network (LIN), and/or other wired or wireless mechanisms.

The computer 28, shown in FIG. 4, may be a microprocessor-based computer implemented via circuits, chips, or other electronic components. For example, the computer 28 may include the processor, the memory, etc. The memory of the computer 28 may include memory for storing programming instructions executable by the processor as well as for electronically storing data and/or databases.

The computer 28 may be programmed to actuate the actuator 26 to inhibit restricting rotation of the spool 22 relative to the housing 32 of the seatbelt retractor 20 for the threshold amount of time after detecting an impact of the vehicle 18. For example, the computer 28 may be programmed to actuate the actuator 26 to inhibit engagement of the braking claw 24 with the spool 22 for the threshold amount of time after detecting an impact of the vehicle 18.

When the actuator 26 is the electromagnetic linear actuator used in combination with the ball sensor 38, the computer 28 may actuate the actuator 26 to inhibit engagement of the braking claw 24 with the spool 22 by transmitting an instruction, e.g., via the communication network 52, instructing the actuator 26 to actuate to the extended position. Other instructions may be transmitted depending on the type and design of the actuator 26, the braking claw 24, various inertial engagement mechanisms, etc., e.g., the instruction may instruct the actuator 26 to generate a magnetic field, etc.

The threshold amount of time permits a certain amount of the webbing 30, e.g., 50 millimeters, to pay out from the seatbelt retractor 20 before the webbing 30 restrains the occupant. For example, during an oblique impact, the occupant may rotate and/or move toward a side of the vehicle. The threshold amount of time may permit payout of webbing 30 to allow such movement before restraining the occupant, e.g., reducing compression of a torso of the occupant, reducing abrasions, lacerations, etc., experienced during the impact, etc.

The threshold amount of time may be empirically determined, e.g., using computer modeling and/or real-world crash testing analysis. The threshold amount of time may be a fixed number or a range of numbers, e.g., as part of a look-up table. For example, the threshold amount of time may be between 20 and 30 milliseconds. The threshold amount of time may be stored in the memory.

The threshold amount of time may be sufficient to permit a threshold length of webbing 30 to payout from the seatbelt retractor 20. The threshold length may be empirically determined, e.g., using computer 28 modeling and/or real-world crash testing analysis. For example, the threshold length may be 50 millimeters.

The threshold amount of time may be based on a type of the impact of the vehicle 18. The type of impact indicates a physical characteristic of the impact, such as a direction of the impact relative to the vehicle 18. For example, the type of impact may be classified based on various crash standards, such as the standards set out by National Highway Traffic Safety Administration (NHTSA), the Federal Motor Vehicle Safety Standard (FMVSS), the New Car Assessment Program (NCAP), the Insurance Institute for Highway Safety (IIHS), etc. Example types of the impact include a front impact, an oblique impact, a side impact, etc. The computer 28 may identify the type of impact based on information received from the impact sensors 50 and/or the sensors 48, e.g., received via the communication network 52.

To determine the threshold amount of time based on the type of impact, the computer 28 may store a look-up table or the like associating various threshold times with various impact types. An example table is shown below:

| Type of Impact | Threshold Amount of Time |
| --- | --- |
| Front Impact | 30 milliseconds |
| Oblique Impact | 25 milliseconds |
| Side Impact | 20 milliseconds |

The threshold amount of time may be based on a detected force of the impact. The computer 28 may detect the force of the impact based on information from the impact sensors 50 and/or the sensors 48, e.g., received via the communication network 52. For example, information from an accelerometer may indicate the force of the impact. To determine the threshold amount of time based on the force of impact, the computer 28 may store a look-up table or the like associating various threshold times with various impact forces. Generally, the greater the force, the shorter the threshold amount of time, and vice versa.

The threshold amount of time may be based on a speed of the vehicle 18 when the impact is detected. The computer 28 may detect the speed of the vehicle 18 when the impact is detected based on information from the sensors 48, e.g., received via the communication network 52. For example, wheel speed sensors may indicate the speed of the vehicle 18. To determine the threshold amount of time based on the speed of the vehicle 18, the computer 28 may store a look-up table or the like associating various threshold times with various speeds. Generally, the greater the speed, the shorter the threshold amount of time, and vice versa.

The threshold amount of time may be identified based a combination of factors. For example, the computer 28 may store a look-up table or the like associating various combinations of impact type, force, and/or speed with various threshold amounts of time.

The computer 28 may be programmed to actuate the actuator 26 to permit restricting rotation of the spool 22 relative to the housing 32 after the threshold amount of time has lapsed. For example, the computer 28 may be programmed to actuate the actuator 26 to permit engagement of the braking claw 24 with the spool 22 after the threshold amount of time has lapsed.

When the actuator 26 is the electromagnetic linear actuator used in combination with the ball sensor 38, the computer 28 may actuate the actuator 26 to permit engagement of the braking claw 24 with the spool 22 by transmitting an instruction, e.g., via the communication network 52, instructing the actuator 26 to actuate to the retracted position. Other instructions may be transmitted depending on the type and design of the actuator 26, the braking claw 24, various inertial engagement mechanisms, etc., e.g., the instruction may instruct the actuator 26 to cease generating a magnetic field, etc.

The computer 28 may be programmed to actuate the seatbelt pretensioner 46 before inhibiting restricting rotation of the spool 22 relative to the housing 32. For example, the computer 28 may transmit an instruction to the pretensioner 46 via the communication network 52 instructing detonation of the explosive charge.

Figure 5:
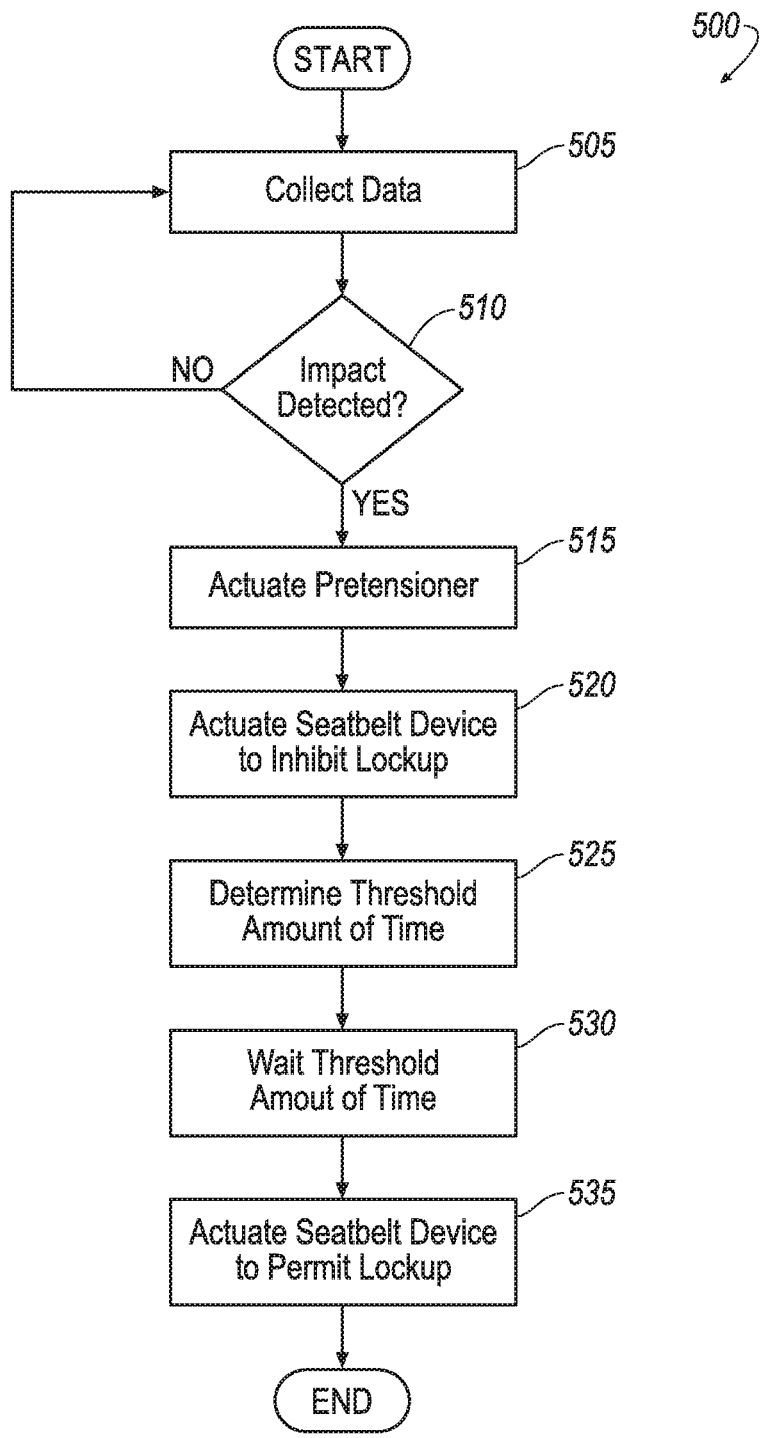
FIG. 5 is a flow cart illustrating an example process for controlling the seatbelt retractor.

FIG. 5 is a process flow diagram illustrating an exemplary process 500 for controlling the seatbelt retractor 20. The process 500 may be executed according to instructions stored in and executable by the computer 28.

The process begins in a block 505 in which the computer 28 receives information, e.g., via the communication network 52, from the sensors 48, the impact sensors 50, etc., e.g., as described herein. The computer 28 may continue to receive information throughout the process 500. Throughout the process 500 in the present context means substantially continuously or at time intervals, e.g., every 5 milliseconds.

Next, at a block 510 the computer 28 determines whether an impact to the vehicle 18 has been detected, e.g., based on information received from the impact sensors 50 via the communication network 52. Upon determining that an impact has been detected, the process 500 moves to a block 515. Additionally, the computer 28 may store a time of detecting the impact. Upon determining that an impact has not been detected, the process 500 returns to the block 505.

At the block 515 the computer 28 actuates the seatbelt pretensioner 46. For example, the computer 28 may transmit an instruction to the pretensioner 46 via the communication network 52.

Next, at a block 520 the computer 28 actuates the actuator 26 to inhibit restricting rotation of the spool 22 relative to the housing 32 of the seatbelt retractor 20. For example, the computer 28 may actuate the actuator 26 to inhibit engagement of the braking claw 24 with the spool 22, e.g., by transmitting an instruction to the actuator 26 via the communication network 52 and as described herein.

At a block 525 the computer 28 determines the threshold amount of time, e.g., based on information from the sensors 48 and/or impact sensors 50, e.g., based on the type of impact, the force of the impact, the speed of the vehicle 18 at the time of detecting the impact, etc., e.g. as described herein.

At the block 530 the computer 28 waits the threshold amount of time. The threshold amount of time may be measured from the time of detecting the impact.

Next, at the block 535 the computer 28 actuates the actuator 26 to permit restricting rotation of the spool 22 relative to the housing 32. For example, the computer 28 may actuate the actuator 26 to permit engagement of the braking claw 24 with the spool 22, e.g., by transmitting an instruction to the actuator 26 via the communication network 52 and as described herein.

After the block 535 the process 500 may end 36. Alternately, the process 500 may return to the block 505.

Computing devices, such as the computer 28, generally include computer-executable instructions, where the instructions may be executable by the processor of the computer 28. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions to perform one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by the computer 28 (e.g., by the processor of the computer 28). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to the processor of the computer 28. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which the computer 28 can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
   a seatbelt retractor having a spool and a braking claw selectively engageable with the spool;

an actuator designed to inhibit engagement of the braking claw with the spool;

a processor; and a memory storing program instructions executable by the processor to actuate the actuator to inhibit engagement of the braking claw with the spool for a threshold amount of time after detecting an impact of a vehicle.

2. The system of claim 1, wherein the actuator is an electromagnetic linear actuator.

3. The system of claim 1, further comprising a ball sensor movable from a first position where the ball sensor does not urge the braking claw into engagement with the spool to a second position where the ball sensor urges the braking claw into engagement with the spool.

4. The system of claim 3, wherein the actuator is designed to inhibit movement of the ball sensor from the first position to the second position.

5. The system of claim 3, wherein the actuator is moveable between a retracted position in which the actuator does not urge the ball sensor to the first position and an extended position in which the actuator urges the ball sensor to the first position.

6. The system of claim 1, wherein the threshold amount of time is less than 30 milliseconds, and the memory further stores instructions to actuate the actuator to permit engagement of the braking claw with the spool after the threshold amount of time has lapsed.

7. The system of claim 1, further comprising an impact sensor, and wherein in the instructions include instructions to detect the impact of the vehicle based on information received from the impact sensor.

\* \* \* \* \*